(12) United States Patent
Books et al.

(10) Patent No.: US 10,336,330 B2
(45) Date of Patent: Jul. 2, 2019

(54) SYSTEMS AND METHODS FOR CONTROLLING A VEHICLE EQUIPPED WITH START-STOP LOGIC IN RESPONSE TO VEHICLE MASS AND ROUTE GRADE

(71) Applicant: Cummins Inc., Columbus, IN (US)

(72) Inventors: Martin T. Books, Columbus, IN (US); Praveen C. Muralidhar, Ann Arbor, MI (US)

(73) Assignee: Cummins Inc., Columbus, IN (US)

( * ) Notice: Subject to any disclaimer, the term of this patent is extended or adjusted under 35 U.S.C. 154(b) by 249 days.

(21) Appl. No.: 15/222,140

(22) Filed: Jul. 28, 2016

(65) Prior Publication Data

US 2017/0043777 A1 Feb. 16, 2017

Related U.S. Application Data

(60) Provisional application No. 62/203,120, filed on Aug. 10, 2015.

(51) Int. Cl.
| | |
|---|---|
| *B60K 6/48* | (2007.10) |
| *B60W 10/06* | (2006.01) |
| *B60W 20/00* | (2016.01) |
| *B60W 30/18* | (2012.01) |
| *B60W 40/13* | (2012.01) |
| *B60W 50/00* | (2006.01) |

(52) U.S. Cl.
CPC ......... *B60W 30/18018* (2013.01); *B60K 6/48* (2013.01); *B60W 10/06* (2013.01); *B60W 20/00* (2013.01); *B60W 30/18118* (2013.01); *B60W 40/13* (2013.01); *B60W 2050/0093* (2013.01); *B60W 2510/0657* (2013.01); *B60W 2520/10* (2013.01); *B60W 2520/105* (2013.01); *B60W 2530/10* (2013.01); *B60W 2550/142* (2013.01); *B60W 2550/40* (2013.01); *B60W 2550/402* (2013.01); *B60Y 2300/18016* (2013.01); *Y02T 10/6286* (2013.01); *Y10S 903/903* (2013.01)

(58) Field of Classification Search
CPC ........... B60W 30/18018; B60W 10/06; B60W 10/02; B60W 10/08; B60W 30/181; B60W 20/00; B60W 2520/10; B60W 2520/105; B60W 2550/402; B60W 2550/40; B60W 2710/06; B60W 2600/00; B60W 2530/10; B60W 2550/142; Y02T 10/6286; B60K 6/44; Y10S 903/903
See application file for complete search history.

(56) References Cited

U.S. PATENT DOCUMENTS

| | | | |
|---|---|---|---|
| 5,748,106 A | * | 5/1998 | Schoenian ........... G07B 15/063 340/7.32 |
| 7,023,312 B1 | | 4/2006 | Lanoue et al. |
| 7,516,007 B2 | | 4/2009 | Tamai et al. |
| 7,647,692 B2 | | 1/2010 | Lanoue et al. |
| 8,090,499 B2 | | 1/2012 | Tamai |

(Continued)

*Primary Examiner* — Thomas Ingram
(74) *Attorney, Agent, or Firm* — Taft Stettinius & Hollister LLP

(57) ABSTRACT

Controls for improved drivability of a vehicle equipped with start/stop logic are disclosed. A nominal control stop for the internal combustion engine of the vehicle is disabled or prevented from occurring in response to a vehicle mass and route grade indicating a roll back condition for the vehicle exists if the nominal control stop for the engine were to take place.

16 Claims, 3 Drawing Sheets

(56) References Cited

U.S. PATENT DOCUMENTS

| | | |
|---|---|---|
| 8,579,765 B2 | 11/2013 | Yu et al. |
| 8,977,449 B2 | 3/2015 | Gibson et al. |
| 8,998,771 B2 | 4/2015 | Pietron et al. |
| 2007/0073466 A1* | 3/2007 | Tamai ................ B60T 7/122 701/70 |
| 2011/0290216 A1* | 12/2011 | Ma ................ F02D 37/02 123/406.76 |
| 2012/0277982 A1* | 11/2012 | Weaver ............ F02D 41/123 701/112 |
| 2014/0188579 A1* | 7/2014 | Regan, III ............ G07B 15/06 705/13 |
| 2015/0073675 A1 | 3/2015 | Malone et al. |
| 2015/0105949 A1 | 4/2015 | Wright et al. |
| 2016/0176404 A1* | 6/2016 | Dlugoss ............ F16H 61/0021 477/97 |

* cited by examiner

SYSTEMS AND METHODS FOR CONTROLLING A VEHICLE EQUIPPED WITH START-STOP LOGIC IN RESPONSE TO VEHICLE MASS AND ROUTE GRADE

The present application claims the benefit of the filing date of U.S. Provisional App. Ser. No. 62/203,120 filed on Aug. 10, 2015, which is incorporated herein by reference in its entirety.

BACKGROUND

The present application relates generally to engine start-stop controls that account for route grade and vehicle mass in stopping the engine of a vehicle.

In automotive vehicles with start-stop control of the engine, the transmission type has a strong influence in vehicle behavior as well as required driver actions during vehicle launching and stopping. One particularly differentiating situation is launching and stopping the vehicle on a grade and what occurs on a launch between the time the driver lifts from the brake pedal and engages the driveline. In the case of an automatic transmission (AT), the torque converter will generate a minor amount of wheel torque in the direction of the selected gear. If the transmission is in a forward gear, the vehicle may experience forward movement on a downhill grade and slight backward movement on a steep uphill grade, while experiencing no movement in other situations.

In the case of an automated manual transmission (AMT) or a manual transmission (MT), there will be a finite period of time where the brake may be released but the driver has not yet applied the accelerator (in an AMT) or released the clutch (MT). During this time, the vehicle will be free to roll if on a grade. Drivers learn to compensate for this roll back through actions such as very rapidly activating the pedals so that any unwanted vehicle movement is minor. Alternatively, a driver may employ the parking brake to keep the vehicle stationary, and release the parking brake in synch with applying driveline torque.

The launch of a vehicle from a stopped position on a grade is further complicated in vehicles equipped with start/stop controls where the engine is initially stopped and must be restarted as part of this launch sequence. In these vehicles the same pedal actions that are used to launch the vehicle are also often used to trigger an engine restart. For example, the engine is restarted when the driver commands a restart, either by stepping in the throttle or releasing the brake pedal.

During the engine restart, the desire is the vehicle will remain stationary. While the vehicle remains stationary on a flat surface, this can't be guaranteed on an inclined surface. Two options exist for preventing roll back in vehicle equipped with start-stop controls. First, the vehicle can be equipped with a device which can provide a hill-hold to preventing the vehicle from rolling back. This increases the cost of the vehicle since such a device must be added to the vehicle and maintained. Second, the engine isn't allowed to stop when the vehicle is on a grade and the restart is avoided, reverting to the behavior of a conventional drivetrain with which most drivers are experienced. However, this reduces the fuel economy benefit of the start-stop system of the vehicle. Therefore, there remains a significant need for the apparatuses, methods and systems disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One example of a system, method, and apparatus includes operating a start-stop vehicle system including an internal combustion engine and a controller configured to, when all other engine stop conditions are met, prevent the stop of the engine when the vehicle is on a grade based on the mass of the vehicle and the severity of the grade. The controller can determine mass from an estimate based on torque output of the system, through programming, or through telematics from an intelligent transportation system or weigh station. The controller can determine grade information using a road grade sensor, over a datalink from an external source, or from an estimate based on torque output if vehicle mass is available. In vehicles that are not equipped with road grade sensors or the vehicle mass cannot be determined, estimates of grade and mass can be employed by the controller to determine when to disable a nominal engine stop condition.

Another example of a system, method, and apparatus includes operating a vehicle system including a controller configured to conditionally stop the vehicle in response to nominal stop conditions and re-start or launch the vehicle after a stop. The controller receives signals from the vehicle or an external source indicating a mass of the vehicle and a road grade. The engine stop is disabled in response to the vehicle mass and severity of the grade associated with the nominal control stop. Disablement of the nominal control stop of the engine is based on conditions that will cause or potentially cause vehicle roll back. The systems, methods and apparatus disclosed herein can be employed in vehicles with manual transmissions and/or vehicles that are not equipped with hill hold capabilities, although applications in other types of vehicles are not precluded.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF ILLUSTRATIVE EMBODIMENTS

Figure 1:
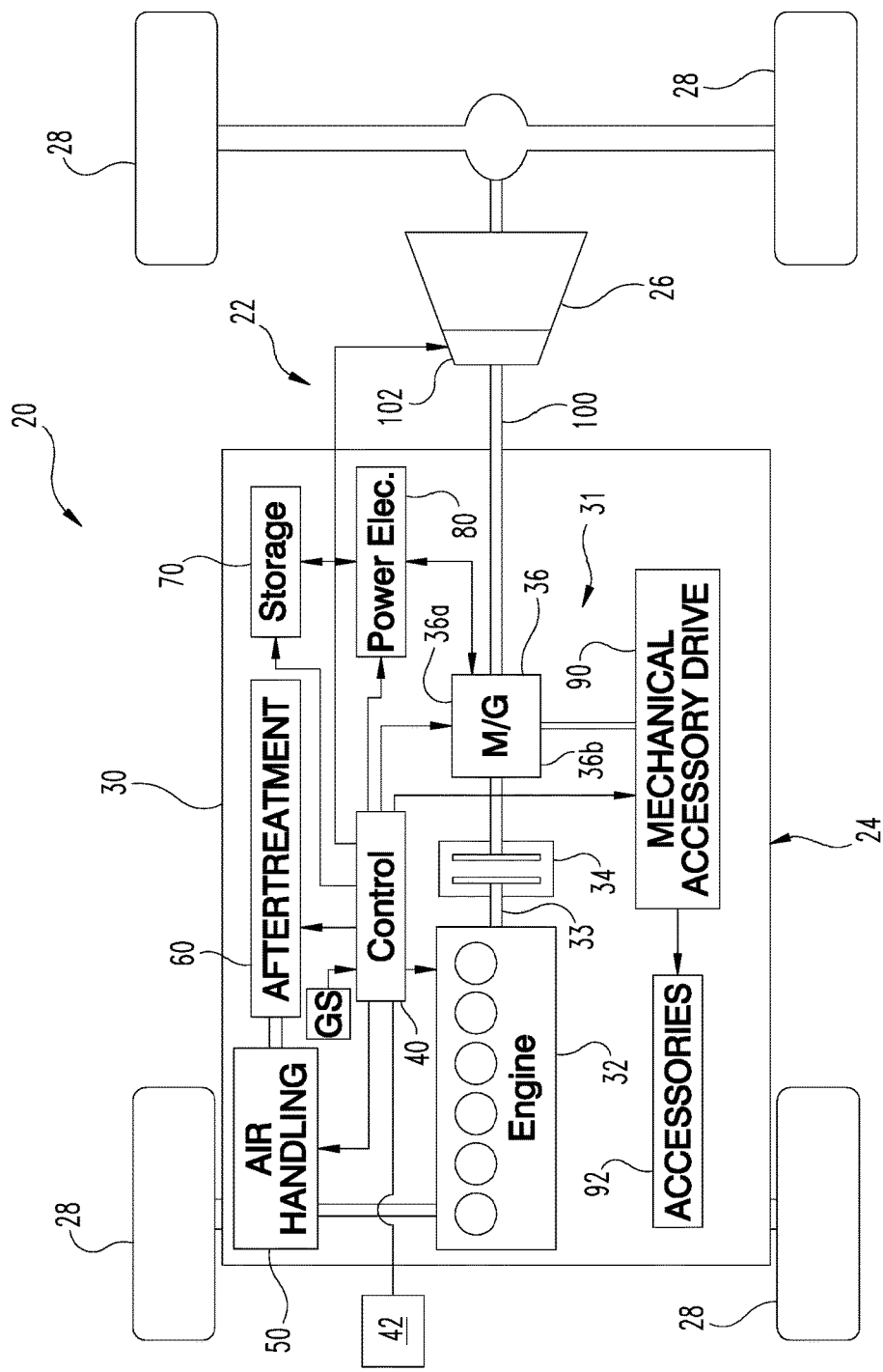
FIG. 1 illustrates a partially diagrammatic view of an exemplary vehicle.

With reference to FIG. 1 there is illustrated a partially diagrammatic view of a vehicle 20 including an example powertrain 22. It shall be appreciated that the configuration and components of vehicle 20 and of powertrain 22 are but one example, and that this disclosure contemplates that a variety of different hybrid and non-hybrid vehicles and powertrain configurations and components may be utilized. Powertrain 22 includes a pretransmission hybrid system 24, a transmission 26, and ground engaging wheels 28. Depicted powertrain 22 system is a series-parallel hybrid (selectable with hybrid clutch 34) system, although the system may be, without limitation, a parallel configuration, a series configuration, a series-parallel hybrid system, and/or a non-hybrid system that is powered for stop-start exclusively by an engine or by a motor (electric vehicle).

It should be appreciated that in this embodiment, the propulsion of vehicle 20 is provided by the rear wheels 28; however in other applications front wheel drive and four/all wheel drive approaches are contemplated. In one form vehicle 20 is an on-road bus, delivery truck, service truck or the like; however in other forms vehicle 20 may be of a different type, including other types of on-road or off-road vehicles.

Pretransmission hybrid system 24 includes hybrid power system 30. Hybrid power system 30 includes internal combustion engine 32, a hybrid clutch 34, motor/generator 36, controller 40, air handling subsystem 50, aftertreatment equipment 60, electrical power storage device 70, electrical power electronics device 80, and mechanical accessory drive subsystem 90. System 30 is illustrated in the form of a parallel hybrid power source 31 such that engine 32 and/or motor/generator 36 can provide torque for power train 22 depending on whether hybrid clutch 34 is engaged. Other hybrid and non-hybrid forms are also contemplated.

It should be appreciated that motor/generator 36 can operate as a motor 36a powered by electricity from storage device 70, or as an electric power generator 36b that captures electric energy. In other operating conditions, the motor/generator 36 may be passive such that it is not operating. In the depicted form, motor/generator 36 has a common rotor and a common stator, and is provided as an integrated unit; however in other embodiments a completely or partially separate motor, generator, rotor, stator, or the like may be employed. The designated motor/generator 36 is intended to encompass such variations. Furthermore it should be appreciated that in alternative embodiments of system 30 some of these features, such as air handling subsystem 50, aftertreatment equipment 60, and/or mechanical accessory drive 90 may be absent and/or other optional devices/subsystems may be included.

In certain embodiments the motor/generator 36 may comprise a hydraulic or pneumatic pump rather than an electric motor/generator. It shall be appreciated that references to a motor/generator herein are intended to encompass both electric motor/generators and non-electric motor/generators such as those comprising hydraulic or pneumatic pumps. Furthermore, power storage device 70 of system 30 may comprise one or more electrochemical batteries, supercapacitors or ultracapacitors, or may alternatively store energy in a different, non-electrical medium such as an accumulator found in a hydraulic or pneumatic hybrid system. It shall be appreciated that references to a battery herein are intended to encompass electrochemical storage batteries, other electrical storage devices such as capacitors, and non-electrical energy storage devices such as accumulators utilized in hydraulic or pneumatic hybrid systems.

In the illustrated embodiment, engine 32 is of a four-stroke, diesel-fueled, compression ignition (CI) type with multiple cylinders and corresponding reciprocating pistons coupled to crankshaft 33, which typically would be coupled to a flywheel. Crankshaft 33 is mechanically coupled to controllable hybrid clutch 34. Engine 32 may be of a conventional type with operation modifications to complement operation in system 30. In other embodiments, engine 32 may be of a different type, including different fueling, different operating cycle(s), different ignition, or the like.

Powertrain 22 includes an output shaft 100 that connects engine 32 and/or motor/generator 36 to transmission 26. In one embodiment, transmission 26 is an automatic transmission including a clutch 102 that is a torque converter with a lock-up clutch to selectively engage output shaft 100 to transmission 26. In another embodiment, transmission 26 is an automated manual transmission that includes a clutch 102 that is controllable to selective engage output shaft 100 to transmission 26.

Vehicle 20 further includes a controller 40 which may be configured to control various operational aspects of vehicle 20 and powertrain 22 as described in further detail herein. Controller 40 may be implemented in a number of ways. Controller 40 executes operating logic that defines various control, management, and/or regulation functions. This operating logic may be in the form of one or more microcontroller or microprocessor routines stored in a non-transitory memory, dedicated hardware, such as a hardwired state machine, analog calculating machine, various types of programming instructions, and/or a different form as would occur to those skilled in the art.

Controller 40 may be provided as a single component, or a collection of operatively coupled components, and may comprise digital circuitry, analog circuitry, or a hybrid combination of both of these types. When of a multi-component form, controller 40 may have one or more components remotely located relative to the others in a distributed arrangement. Controller 40 can include multiple processing units arranged to operate independently, in a pipeline processing arrangement, in a parallel processing arrangement, or the like. In one embodiment, controller 40 includes several programmable microprocessing units of a solid-state, integrated circuit type that are distributed throughout hybrid power system 30 that each includes one or more processing units and non-transitory memory. For the depicted embodiment, controller 40 includes a computer network interface to facilitate communications using standard Controller Area Network (CAN) communications or the like among various system control units. It should be appreciated that modules or other organizational units of controller 40 refer to certain operating logic performing indicated operations that may each be implemented in a physically separate controller of controller 40 and/or may be virtually implemented in the same controller.

Controller 40 and/or any of its constituent processors/controllers may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or functional components as would occur to those skilled in the art to perform the desired communications.

The description herein including modules and/or organizational units emphasizes the structural independence of the aspects of the controller, and illustrates one grouping of operations and responsibilities of the controller. Other groupings that execute similar overall operations are understood within the scope of the present application. Modules and/or organizational units may be implemented in hardware and/or as computer instructions on a non-transient computer readable storage medium, and may be distributed across various hardware or computer based components.

Example and non-limiting implementation elements of modules and/or organizational units of the controller 40 include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

One of skill in the art, having the benefit of the disclosures herein, will recognize that the controllers, control systems and control methods disclosed herein are structured to perform operations that improve various technologies and provide improvements in various technological fields. Without limitation, example and non-limiting technology improvements include improvements in start-stop control of internal combustion engines, improvements in engine torque generation and torque control, engine fuel economy performance, improvements in noise, vibration and harshness control for internal combustion engines, improvements in performance or operation of aftertreatment systems and/or components of vehicle systems, and/or improvements in emissions reduction. Without limitation, example and non-limiting technological fields that are improved include the technological fields of internal combustion engines with hybrid powertrains and related apparatuses and systems as well as vehicles including the same.

Certain operations described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Figure 2:
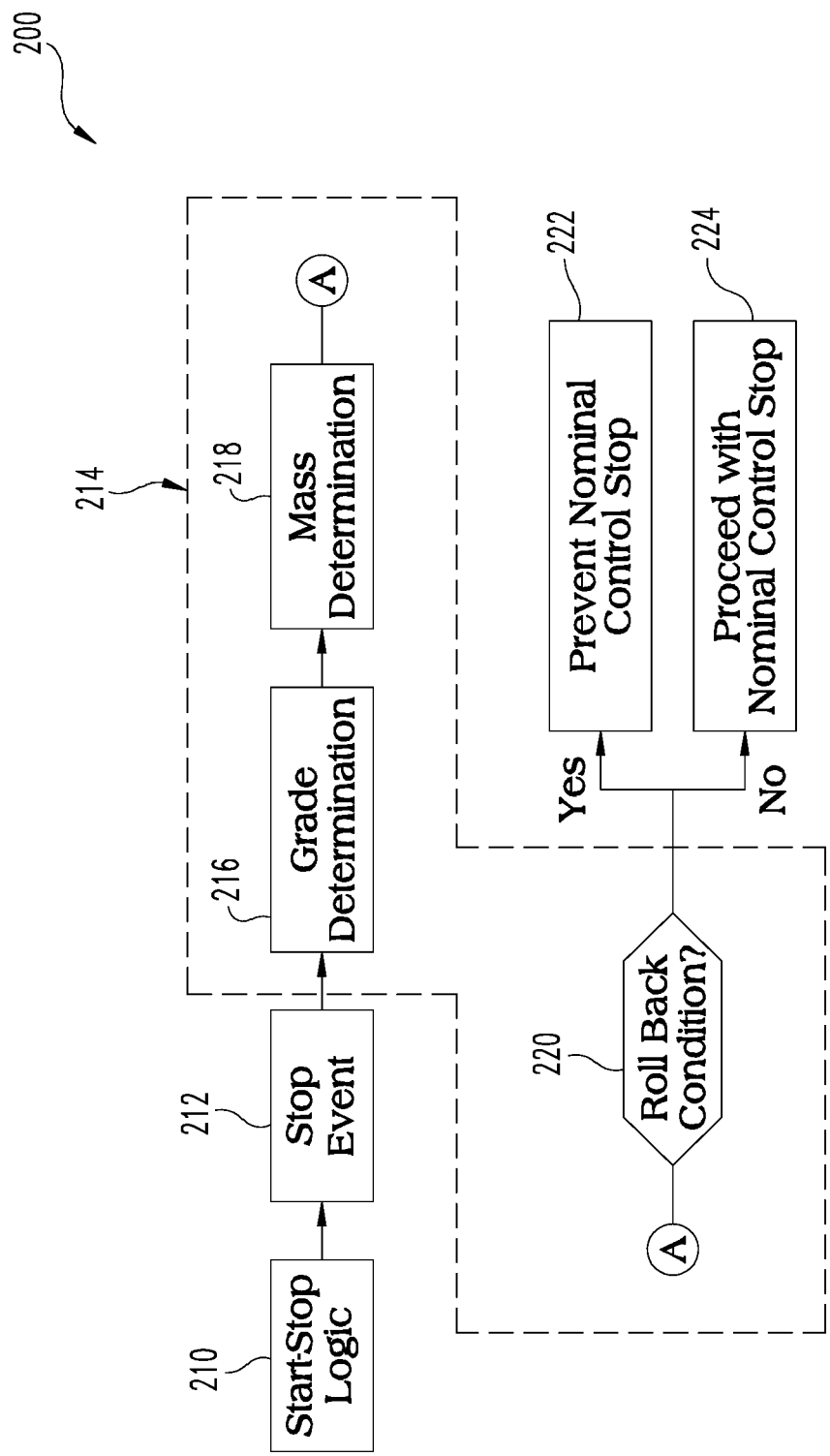
FIG. 2 illustrates a block diagram of exemplary controls logic for a start-stop operation of the exemplary vehicle.

With reference to FIG. 2 there is illustrated a block diagram of exemplary controls logic 200 which may be implemented in a control system, for example, such as a controls system including controller 40 described above in connection with FIG. 1, to disable the nominal control stop of engine 32. It is contemplated that controller 40 can be an engine controller that controls operation of powertrain 22, although other controller types are also contemplated, such as a transmission controller that controls operations of transmission 26, or an engine controller that provides control signals for execution by a transmission controller.

Controls logic 200 includes an engine start-stop logic block 210 which receives inputs that control start-stop of engine 32 according to any existing start-stop logic. Engine start-stop logic block 210 provides a stop event variable 212 as an output in response to an engine stop event determined by start-stop logic block 210. Stop event variable 212 is provided as a nominal control stop input to a stop mode disablement logic block 214, which outputs a decision on whether to override the nominal control stop or to allow the nominal control stop.

The stop mode disablement logic block 214 includes a grade determination block 216 that determines the route grade of the vehicle at the location of the nominal control stop. Stop mode disablement logic block 214 also includes a mass determination block 218 that determines the mass of the vehicle. Engine controller 40 may determine the route grade using a grade sensor GS on vehicle 20. Engine controller 40 alternatively or additional may determine the route grade over datalink from an external source 42, or estimate route grade it based on torque output of engine 32 and/or hybrid power system 30, if accurate vehicle mass information is available. Similarly, controller 40 may determine vehicle mass from an estimate based on the torque output of the hybrid power system 30, or through programming or telematics from an intelligent transportation system or weigh station. In some vehicles, which aren't equipped with a grade sensor GS or in which the vehicle mass can't be accurately determined, effects of route grade and vehicle mass on output torque can't be distinguished. In such installations, an estimate of the grade-mass information can be used to influence engine nominal control stop override decisions.

The route grade and vehicle mass are provided to roll back determination logic block 220 which determines whether a roll back condition exists at the vehicle stop location when all other engine stop conditions are met. Roll back determination logic block 220 uses the grade determination and vehicle mass to check against calibratable thresholds or other standards to determine whether stopping the engine in response to a nominal control stop event would result in the vehicle rolling backwards or, in some embodiments, forwards.

For example, in one embodiment, the override of the nominal control stop is decided based on the following look-up table:

TABLE 1

| | Vehicle Mass | | |
|---|---|---|---|
| Road Grade | Low Mass | Medium Mass | High Mass |
| Flat Ground | ES Allowed | ES Allowed | ES Allowed |
| Shallow incline | ES Allowed | ES may be allowed | ES Disallowed |
| Steep Grade | ES may be allowed | ES Disallowed | ES Disallowed |

ES = Engine Stop

In other embodiments, calculations, tables, charts and/or other tools are used to determine a roll back or roll forward condition based on the vehicle mass and route grade. The determination from roll back determination logic block 220 is one of preventing the nominal control stop selection 222 and proceeding with the nominal control stop selection 224. Under certain circumstances (e.g., nominally loaded vehicle on a shallow incline or lightly loaded vehicle on a steeper grade), engine 32 may be allowed to stop if there is a mechanism to provide hill hold or some way of locking the wheels, preventing the vehicle from the moving when the engine is stopped.

It shall be appreciated that the logical states of the controls disclosed herein may be implemented in a variety of forms such as "1/0," "yes/no," "true/not true," "yes/not yes," and "true/false" among others. It shall be further appreciated that while particular logical phrasings have been used herein there is no intent to exclude the alternatives unless indicated to the contrary.

Figure 3:
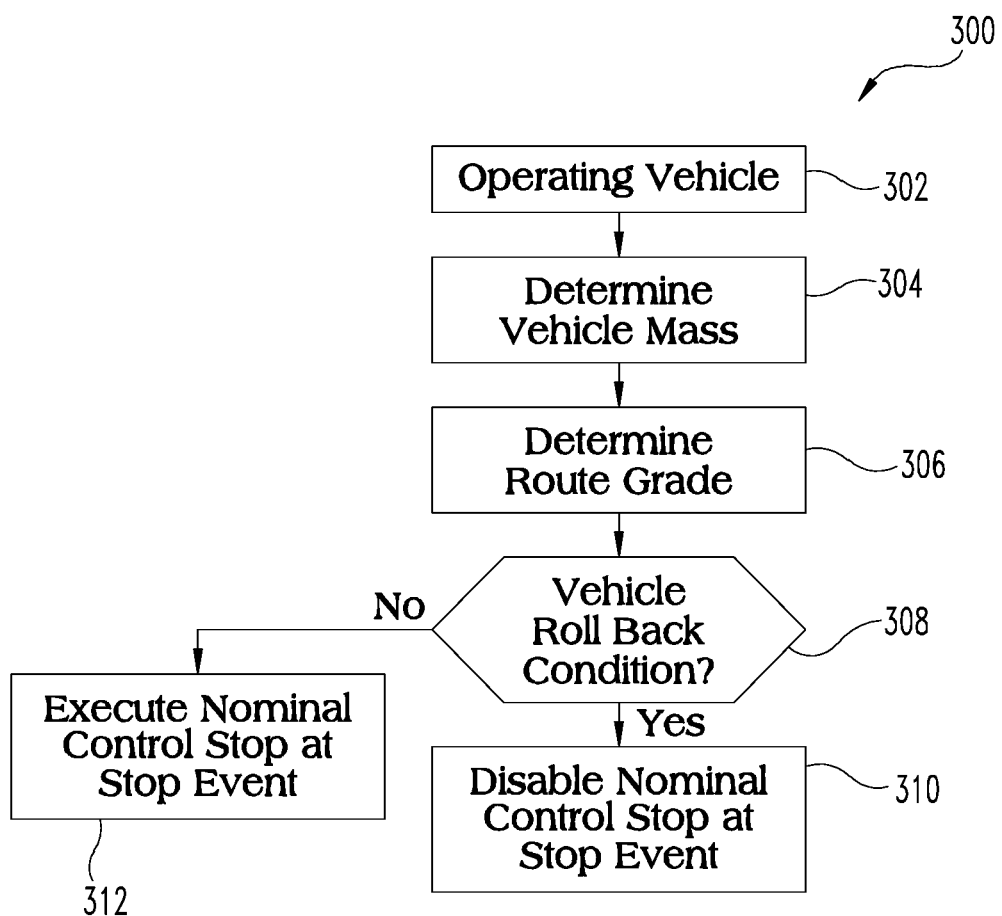
FIG. 3 illustrates a flow diagram of an exemplary start-stop control procedure.

Referring to FIG. 3, an exemplary flow diagram of a procedure 300 for controlling start-stop operation of vehicle 20 is provided. Procedure 300 includes an operation 302 that includes operating a vehicle 20 having an internal combustion engine 32 and a controller 40 configured to conditionally stop and re-start the internal combustion engine 32. Procedure 300 continues at operation 304 to determine a vehicle mass of the vehicle 20 and an operation 306 to determine a route grade of the route of vehicle 20. The route grade is determined at a location at, near, or otherwise associated with a nominal control stop of the internal combustion engine 32 in response to a stop event for the vehicle 20. The stop event for vehicle 20 can be determined in response to, for example, one or more of a vehicle speed being at or approaching 0 speed, a vehicle deceleration indicating an imminent vehicle stop, a determination that the vehicle is at or approaching a pre-determined route stop, and/or an operator input from a vehicle braking device.

Procedure 300 continues from operation 306 at conditional 308 to determine if a vehicle roll back condition exists. If conditional 306 is positive, procedure 200 continues at operation 310 to disable the nominal control stop of the engine 32 and operating the engine 32 during the stop event to prevent vehicle roll back. If conditional 306 is negative, then the nominal control stop of engine 32 is allowed and procedure 300 continues at operation 312 and executes the nominal control stop to stop the engine in response to the stop event.

In one embodiment, procedure 300 decreases a route grade threshold for indicating a vehicle roll back condition as the vehicle mass increases. In other embodiments, the vehicle roll back condition is more likely to be indicated as the vehicle mass increases and/or as the route grade increases.

Procedure 300 can further include determining the route grade in response to an output of route grade sensor GS on the vehicle 20 that is indicative of the route grade at the current location of vehicle 20. Other embodiments of procedure 300 additionally or alternatively include determining the route grade in response to an input to controller 40 over a datalink from an external source that indicates the route grade. Example external sources include a global positioning system, a map database, an intelligent transportation system, and/or a telemetry system. In still other embodiments, procedure 300 includes determining the route grade from a route grade estimate based on a torque output of the engine 32 and the mass of vehicle 20.

In still other embodiments, procedure 300 includes determining the route grade in response to an estimate of the route grade that is based on a torque output of the engine 32 and the mass of vehicle 20. In other embodiments, the procedure 300 includes determining vehicle mass in response to one or more of an estimate based on a torque output of the engine 32, an input to controller 40 from an external source such as a weigh station or intelligent transportation system, and/or a mass determination algorithm stored in controller 40.

Various aspects of the present disclosure are contemplated. For example, according to one aspect a method includes operating a vehicle including an internal combustion engine and a controller configured to conditionally stop and re-start the internal combustion engine; determining a vehicle mass and a route grade associated with a nominal control stop of the internal combustion engine in response to a stop event for the vehicle; and disabling the nominal control stop of the engine and operating the internal combustion engine during the stop event in response to the vehicle mass and the route grade indicating a vehicle roll back condition exists.

In one embodiment of the method, the vehicle roll back condition threshold decreases as the vehicle mass increases and/or as the road grade increases. In another embodiment, the route grade is determined from one of a route grade sensor on the vehicle, an input from an external source over a datalink, and from an estimate based on a torque output of the engine and the vehicle mass. In yet another embodiment, the vehicle mass is determined from one of an estimate based on a torque output of the engine, an input from an external source such as a weight station or intelligent transportation system, and a mass determination algorithm.

In still another embodiment, the vehicle includes a hybrid power train with a motor/generator selectively engageable to a crankshaft of the internal combustion engine with a hybrid clutch. In another embodiment, the vehicle further includes a motor/generator system operatively coupled with the internal combustion engine, and an energy storage system operatively coupled with the motor/generator system.

According to another aspect, a system includes a vehicle including an internal combustion engine, a transmission, and a clutch connecting the internal combustion engine and the transmission. The vehicle includes a motor/generator operable to start the internal combustion engine and a controller operably connected to the internal combustion engine and the motor/generator. The controller is configured to conditionally execute a nominal control stop of the internal combustion engine in response to a stop event for the vehicle. The controller is further configured to disable the nominal control stop of the internal combustion engine in response to a route grade and a vehicle mass indicating a roll back condition for the vehicle is present in response to the internal combustion engine being stopped.

In one embodiment, the motor/generator is operable to propel the vehicle when the internal combustion engine is stopped. In another embodiment, the vehicle includes a route grade sensor connected to the controller that is configured to provide a route grade input to the controller. In yet another embodiment, the vehicle includes a hybrid power train with a motor/generator selectively engageable to a crankshaft of the internal combustion engine with a hybrid clutch. In yet another embodiment, the controller is configured so that a threshold of the route grade indicating the vehicle roll back condition decreases as the vehicle mass increases.

According to another aspect, an apparatus is provided that includes a controller operably connectable to an internal combustion engine and a motor/generator of a vehicle. The motor/generator is operable to start the internal combustion engine from a nominal control stop commanded by the controller. The controller is configured to determine a vehicle mass and a route grade of the vehicle and conditionally execute a nominal control stop of the internal combustion engine in response to a stop event for the vehicle. The controller is further configured to disable the nominal control stop of the internal combustion engine in response to a roll back condition determined in response to the route grade and the vehicle mass.

In one embodiment, the controller is configured to determine the stop event in response to one of a zero vehicle speed and a vehicle deceleration indicating an imminent vehicle stop. In another embodiment, the controller is configured to determine the route grade in response to at least one of an output of a route grade sensor on the vehicle, a route grade input from an external source over a datalink connected to the controller, and an estimate determined by the controller based on a torque output of the internal combustion engine and the vehicle mass. In yet another embodiment, the controller is configured to determine the vehicle mass in response to at least one of an estimate based on a torque output of the engine, a vehicle mass input from an external source, and a vehicle mass determination algorithm.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
   operating a vehicle including an internal combustion engine and a controller configured to conditionally stop and re-start the internal combustion engine;
   determining a vehicle mass and a route grade associated with a nominal control stop of the internal combustion engine in response to a stop event for the vehicle; and
   disabling the nominal control stop of the engine and operating the internal combustion engine during the stop event in response to the vehicle mass and the route grade indicating a vehicle roll back condition exists, wherein the route grade is determined in response to an input from an external source over a datalink that is indicative of the route grade, and from an estimate based on a torque output of the engine and the vehicle mass.

2. The method of claim 1, wherein a threshold of the route grade indicating the vehicle roll back condition decreases as the vehicle mass increases.

3. The method of claim 2, wherein the stop event is determined in response to a zero vehicle speed.

4. The method of claim 1, wherein the stop event is determined in response to a vehicle deceleration indicating an imminent vehicle stop.

5. The method of claim 1, wherein the vehicle mass is determined in response to one or more of an estimate based on a torque output of the engine, an input from an external source, and a mass determination algorithm.

6. The method of claim 5, wherein the external source includes at least one of a weigh station and an intelligent transportation system.

7. The method of claim 1, wherein the vehicle includes a hybrid power train with a motor/generator selectively engageable to a crankshaft of the internal combustion engine with a hybrid clutch.

8. The method of claim 1, wherein the vehicle further includes a motor/generator system operatively coupled with the internal combustion engine, and an energy storage system operatively coupled with the motor/generator system.

9. A system, comprising:
   a vehicle including an internal combustion engine, a transmission, and a clutch connecting the internal combustion engine and the transmission, the vehicle including a motor/generator operable to start the internal combustion engine; and
   a controller operably connected to the internal combustion engine and the motor/generator, wherein the controller is configured to conditionally execute a nominal control stop of the internal combustion engine in response to a stop event for the vehicle, wherein the controller is further configured to disable the nominal control stop of the internal combustion engine in response to a route grade and a vehicle mass indicating a roll back condition for the vehicle is present in response to the internal combustion engine being stopped, wherein the controller is configured to determine a route grade input from an external source over a datalink connected to the controller, and an estimate determined by the controller based on a torque output of the internal combustion engine and the vehicle mass.

10. The system of claim 9, wherein the motor/generator is operable to propel the vehicle when the internal combustion engine is stopped.

11. The system of claim 9, wherein the vehicle includes a hybrid power train with a motor/generator selectively engageable to a crankshaft of the internal combustion engine with a hybrid clutch.

12. The system of claim 9, wherein the controller is configured so that a threshold of the route grade indicating the vehicle roll back condition decreases as the vehicle mass increases.

13. An apparatus comprising:
   a controller operably connectable to an internal combustion engine and a motor/generator of a vehicle wherein the motor/generator is operable to start the internal combustion engine from a nominal control stop commanded by the controller, wherein the controller is configured to determine a vehicle mass and a route grade of the vehicle and conditionally execute a nominal control stop of the internal combustion engine in response to a stop event for the vehicle, wherein the controller is configured to determine the route grade in response to a route grade input from an external source over a datalink connected to the controller and an estimate determined by the controller based on a torque output of the internal combustion engine and the vehicle mass, wherein the controller is further configured to disable the nominal control stop of the internal combustion engine in response to a roll back condition determined in response to the route grade and the vehicle mass.

14. The apparatus of claim 13, wherein the controller is configured to determine the stop event in response to one of a zero vehicle speed and a vehicle deceleration indicating an imminent vehicle stop.

15. The apparatus of claim 13, wherein the controller is further configured to determine the route grade in response to an output of a route grade sensor on the vehicle.

16. The apparatus of claim 13, wherein the controller is configured to determine the vehicle mass in response to one or more of an estimate based on a torque output of the engine, a vehicle mass input from an external source, and a vehicle mass determination algorithm.

* * * * *